Figures 1, 2:
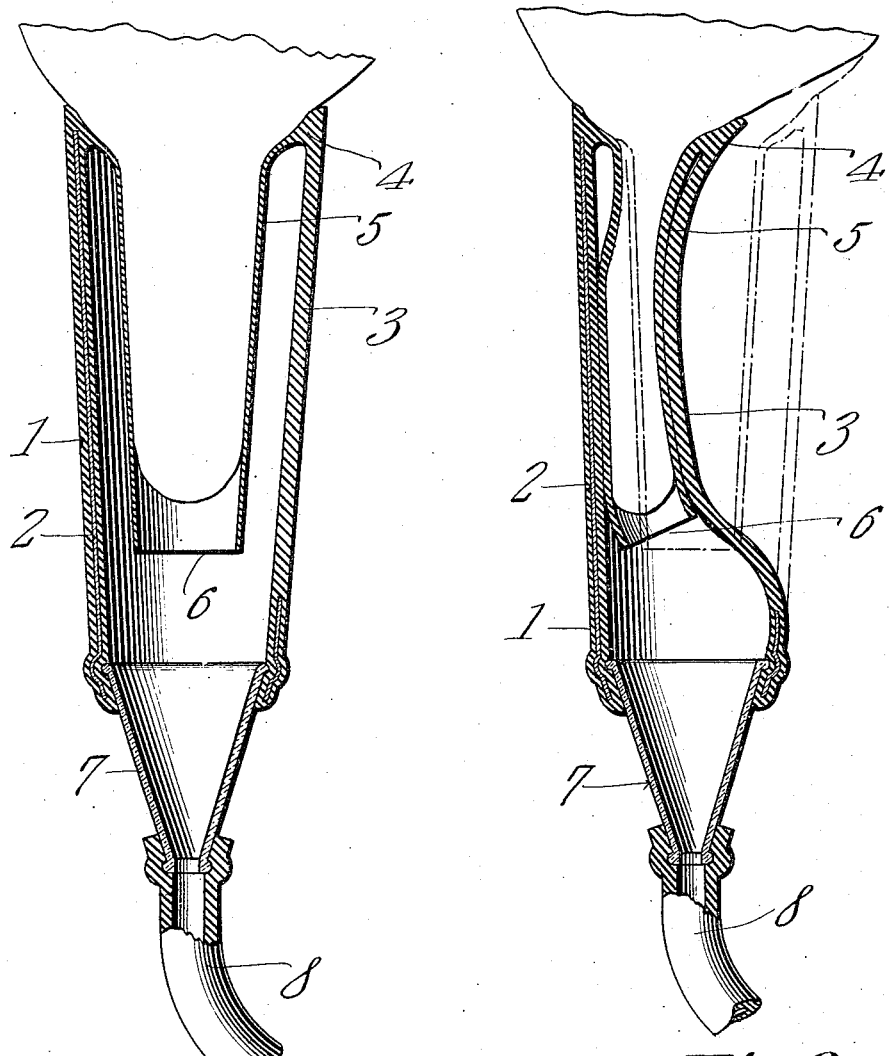

D. KLEIN.
TEAT CUP.
APPLICATION FILED JAN. 18, 1910.

980,968.

Patented Jan. 10, 1911.

Witnesses
E. F. Stewart
F. T. Chapman

Inventor
Daniel Klein
By C. A. Snow & Co.
Attorneys

UNITED STATES PATENT OFFICE.

DANIEL KLEIN, OF SPOKANE, WASHINGTON.

TEAT-CUP.

980,968.

Specification of Letters Patent. Patented Jan. 10, 1911.

Application filed January 18, 1910. Serial No. 538,737.

*To all whom it may concern:*

Be it known that I, DANIEL KLEIN, a citizen of the United States, residing at Spokane, in the county of Spokane and State of Washington, have invented a new and useful Teat-Cup, of which the following is a specification.

This invention has reference to improvements in teat cups designed more especially for use in connection with milking machines of the pulsator type wherein the teat enveloped by the cup is subjected to the alternate action of a partial vacuum and the restoration of atmospheric pressure. Such teat cups are commonly made of more or less rigid material designed to receive and envelop the teat while one or more portions of the walls of the cup are made sufficiently flexible or elastic to yield to atmospheric pressure on the reduction of pressure within the cup in such manner as to compress the teat so as to cause a flow of milk therefrom. It has been found in practice that such cups though closely simulating the action of natural or hand milking are liable to produce more or less congestion of the teats due to the action of the reduced atmospheric pressure within the cup.

It is the object of the present invention to retain the advantageous features of teat cups having portions of the walls collapsible at sub-atmospheric pressure within the cup while at the same time protecting the walls of the teat from the action of such reduced pressure so that congestion is avoided, but at the same time in no wise interfering with the mechanical action of the cup to cause the expulsion of the milk from the teat.

The present invention comprises a teat cup of the collapsible type provided with a sleeve or envelop designed to receive and closely embrace the teat within the cup and except at the teat receiving end being unconnected with the inner walls of the cup. It is found advantageous to apply to the discharge end of the cup a transparent connector for the usual conduit leading to the pulsator, this connector being usually of glass and permits ready inspection of the flow of milk.

The invention will be best understood from a consideration of the following detail description taken in connection with the accompanying drawings forming a part of this specification, in which drawings, Figure 1 is a longitudinal axial section of a teat cup embodying the present invention, showing its application to the teat of a cow with the cup in the normal condition. Fig. 2 is a similar view showing the action of the cup under internal sub-atmospheric pressure.

Referring to the drawings there is shown a cup 1 which may be of known construction in so far as its walls are concerned, a portion of the walls being stiffened by an interior material 2 while another portion 3 of the walls may be quite flexible and elastic so as to normally retain its shape but to readily yield to atmospheric pressure when sub-atmospheric pressure is produced within the cup. One end of the cup is shaped to receive the teat and engage the udder about the root of the teat, as indicated at 4, and connected to this portion of the cup there is a sleeve or envelop 5 extending toward the other end of the cup for a sufficient distance to envelop the entire length of a teat introduced thereinto. This envelop is quite separate from the inner walls of the cup except at the end 4 where the envelop is joined to the cup. In the practical embodiment of the invention the sleeve 5 is made of soft, elastic rubber, although not necessarily confined to such material. The end of the envelop 5 remote from the end 4 of the cup is freely open as shown at 6. That end of the cup 1 remote from the end 4 receives the wide end of a funnel 7, preferably of glass, and the narrow end of the funnel receives a conduit 8 leading to the pulsator and milk receptacle, which pulsator and receptacle being of ordinary and well-known construction are not shown in the drawings.

In the practical embodiment of the invention the sleeve 5 is made so as to readily receive a teat but at the same time quite closely embrace such teat.

In the ordinary operation of the milking machine of which the teat cup forms a part there is produced within the teat cup a partial vacuum and then this vacuum is broken so as to restore normal atmospheric pressure within the teat cup and then the partial vacuum is again produced, and so on continuously. Each time the partial vacuum is established within the teat cup the flexible wall 3 collapses against the teat and since this wall is made more flexible toward the root of the teat it first collapses at such point and compresses the teat and this compression is progressive toward the discharge end of the teat thus forcing milk therefrom. On the restoration of atmospheric pressure within the cup the wall 3 assumes its normal position thus releasing the teat from compression and allowing the milk to flow therein which inflow of milk is discharged by the next compressive action of the cup, this being the normal action of the teat cup in connection with the pulsator type of milking machine. When the walls of the teat are directly subjected to this alternate partial vacuum and restoration of atmospheric pressure there is a tendency to produce congestion of the teat, this being an objectionable feature in the use of milking machines. This is entirely obviated by the use of the elastic envelop 5 which protects the walls of the teat against the direct action of the sub-atmospheric pressure within the cup but does not in any manner interfere with the compressive action of the collapsible portion of the cup so that the milking operation may proceed in the usual manner without deleterious effect upon the teat, the latter being protected by the elastic envelop.

The invention is not confined to the exact construction shown but may be varied so long as the salient features of the invention are retained. Whatever the character of the cup the teat is protected from the direct action of the reduced pressure within the cup by the sleeve or sheath enveloping the teat and protecting the same throughout its length.

The inner sheath 5 is constructed of very thin and soft rubber and is capable of being distended in case the teat is larger than the inside diameter of the sheath, so that the teat will slip down until the top of the cup rests against the bottom of the udder.

The glass funnel enables the operator to see whether the milk is flowing properly in each cup as well as to ascertain when any particular quarter of the udder is milked out, this being a very desirable feature.

What is claimed is:—

1. A teat cup adapted to collapse progressively from the udder end toward the discharge end on the production therein of sub-atmospheric pressure, said teat cup being provided with a readily collapsible interior sleeve or sheath for receiving the teat for substantially the entire length thereof, said sheath being connected to the cup at the udder end only.

2. A teat cup collapsible progressively from the udder end toward the discharge end and provided on its interior with a teat-receiving envelop or sheath connected at one end to the cup and otherwise free from the cup, said sheath being of a length to house the teat for the entire length of the latter.

3. A teat cup having walls yieldable to atmospheric pressure on the production within the teat cup of sub-atmospheric pressure, said walls being more yieldable at the udder end than at the discharge end, and a sheath for the teat within the cup and spaced from the inner walls of the cup, said sheath being yieldable to the collapsing movement of the walls of the cup and of a length to house the teat for substantially the entire length thereof.

In testimony that I claim the foregoing as my own, I have hereto affixed my signature in the presence of two witnesses.

DANIEL KLEIN.

Witnesses:
A. C. WELD,
K. E. DAVIS.